Patented July 7, 1931

1,813,788

UNITED STATES PATENT OFFICE

GEORGE B. WALDEN, OF SOUTHPORT, INDIANA, ASSIGNOR TO ELI LILLY AND COMPANY, OF INDIANAPOLIS, INDIANA, A CORPORATION OF INDIANA

LIVER EXTRACT FOR SECONDARY ANEMIA AND PROCESS OF MAKING IT

No Drawing. Application filed October 10, 1930. Serial No. 487,907.

It is the object of my invention to produce a gland extract effective in the treatment of secondary anemia, especially by oral administration.

It has been known that relief in cases of certain secondary anemia could often be obtained by feeding liver and/or kidney. However, many patients have found it absolutely impossible to eat for a sufficient period of time the great quantities of liver that are required to get beneficial results. On account of this difficulty, a product of dried whole liver has heretofore been prepared, and has been found to give beneficial results; but even this dried whole-liver product had to be ingested in such large quantities that it was found practically impossible to give effective therapeutic doses over a period of time.

The liver and/or kidney substance which was ingested either in the raw or cooked form or in the dried-whole form contained much material that was inert, so far as concerned the relief of secondary anemia; but it was administered because there was no known way of separating the potent material from the inert material of the whole gland, even though it was realized that there was such inert material present.

It is already known that a liver-fraction potent in the treatment of pernicious anemia may be obtained. This is a fraction that is mainly soluble in alcohol of 70% concentration but mainly insoluble in alcohol of 93–95% concentration—although, as in other glandular extracts, neither this solubility nor this insolubility is complete or 100%. But this pernicious-anemia fraction, although spectacularly and sensationally effective in the treatment of pernicious anemia, is only very slightly effective in the treatment of secondary anemia.

By my present invention, I obtain a potent extract of liver and/or kidney, having the greater part of the effectiveness of the original gland in relieving certain secondary anemia, but freed from the greater part of that material of the original gland which is inert so far as the effect on secondary anemia is concerned. I have thus been able to obtain a potent liver and/or kidney extract which has only a small fraction of the bulk of the original gland, and which may be effectively administered orally in small doses; and yet which is found to be highly effective in the relief of certain secondary anemias.

So far as I know, I am the first to produce such a liver and/or kidney extract, whether administrable orally or parenterally, that has been effective in relieving secondary anemia, by causing a production of new hemoglobin and new red corpuscles.

My product is found in many cases to supplement and to be supplemented by iron salts in producing new hemoglobin. For instance, iron chloride, iron citrate, iron sulphate, or iron ammonium citrate—either ferric or ferrous salts—may be used. That is, my product has a marked effectiveness alone, and iron salts have some effectiveness alone, in relieving certain secondary anemias; but their effectiveness when administered together is often markedly increased, and this mixture is found to be effective in a greater proportion of secondary anemia cases. The proportion of the iron salts may be varied over a very wide range; but I prefer at present to include the iron salts in the ratio of about 1 part of the salts to from 1 to 20 parts of the liver and/or kidney extract. No fixed ratio is essential.

The effective secondary-anemia fraction of the liver and/or kidney, as contained in any extract, probably acts by supplying a deficiency of something which the patient should have in his own body, and which somehow controls, and/or partly or wholly supplies the material for, the production of new hemoglobin and related pigments.

In carrying out my invention, I may use liver and/or kidney from any animal, as from hogs or cattle. I mince or grind fine a quantity of liver and/or kidney, desirably from freshly slaughtered animals or glands immediately refrigerated after removal from freshly slaughtered animals and kept refrigerated until used, although I may use glands so long as they are suitable for edible purposes. I extract these glands, desirably several times, with an extractive agent which is capable of taking up those parts of the glands which are effective in relieving secondary anemia, for which purpose I find that slightly acid hot water, desirably nearly boiling and containing enough acid so that the hydrogen ion concentration of the final extract is pH 5 to pH 6, is highly suitable. The acid used is conveniently sulphuric or hydrochloric acid. The extract is removed from the residue of the gland, as by decantation.

The water extract is evaporated down to a thick syrup. Then alcohol (desirably ethyl alcohol or a mixture of ethyl alcohol with 5% methyl alcohol) is added to produce an alcohol concentration of between 50% and 75%, usually of about 70%; which produces a precipitate, which is separated as by filtration or decantation.

This precipitate is an effective secondary-anemia fraction. It weighs less than 10%, and usually about 3%, as much as the whole gland; it is sparingly soluble in slightly acid hot water and practically insoluble in alcohol at an alcohol concentration greater than 70%; and it has a secondary-anemia potency of over 50%, and usually of about 66⅔%, of that of the whole gland from which it was derived. It also contains a slight pernicious-anemia potency, but that is relatively small.

The following is an example of an extraction in accordance with my invention:

1000 grams of hog livers are finely minced, and extracted at 85° C. for several hours with 1500 cc. of water containing ¼% $H_2SO_4$. The watery extract is separated by filtration. The extract is concentrated to a thick syrup, of about 200 cc. volume.

Alcohol is added to this syrup to make an alcohol concentration of 70%. A precipitate is then obtained, and it is separated from the liquid by filtration.

This precipitate is the product containing the bulk of the secondary-anemia fraction, and usually weighs between 15 to 50 grams.

This product is usually dispensed in bottles, and conveniently administered orally, as in orange juice or sprinkled on cereals or as part of the filler in sandwiches or in capsules. An effective dose is from two of four level teaspoons per day.

I claim as my invention:

1. The method of producing from glands of the class which comprises the liver and the kidney a concentrated substance capable of producing beneficial effects in the treatment of certain secondary anemias, which consists in extracting the gland with hot slightly acid water of between pH 5 and pH 6, removing the extract from the residue and concentrating it, mixing alcohol with the concentrated extract to produce an alcohol concentration of between 50% and 75% and thus obtaining a precipitate, and separating and preserving the precipitate thus obtained.

2. The method of producing from glands of the class which comprises the liver and the kidney a concentrated substance capable of producing beneficial effects in the treatment of certain secondary anemias, which consists in extracting the gland with hot slightly acid water, removing the extract from the residue and concentrating it, mixing alcohol with the concentrated extract to produce an alcohol concentration of between 50% and 75% and thus obtaining a precipitate, and separating and preserving the precipitate thus obtained.

3. The method of producing from glands of the class which comprises the liver and the kidney a concentrated substance capable of producing beneficial effects in the treatment of certain secondary anemias, which consists in extracting the gland with hot slightly acid water of between pH 5 and pH 6, removing the extract from the residue, mixing alcohol with the extract to produce an alcohol concentration of between 50% and 75% and thus obtaining a precipitate, and separating and preserving the precipitate thus obtained.

4. The method of producing from glands of the class which comprises the liver and the kidney a concentrated substance capable of producing beneficial effects in the treatment of certain secondary anemias, which consists in extracting the gland with hot slightly acid water, removing the extract from the residue, mixing alcohol with the extract to produce an alcohol concentration of between 50% and 75% and thus obtaining a precipitate, and separating and preserving the precipitate thus obtained.

5. An extract derived from the glands of the class which comprises the liver and the kidney of animals, which product is effective by oral administration in relieving the symptoms of certain secondary anemias, has over half of the potency of the original gland for that purpose, and when in solid form has a weight less than one tenth of the original gland from which it is derived.

6. An extract derived from the glands of the class which comprises the liver and the kidney of animals, which product is effective by oral administration in relieving the symptoms of certain secondary anemias, has over half of the potency of the original gland for that purpose, and when in solid form has a weight less than one-tenth of the original gland from which it is derived; in combination with an iron salt.

7. A product derived from the glands of the class which comprises the liver and the kidney of animals, which product is in solid form, is sparingly soluble in slightly acid hot water, and practically insoluble in alcohol at an alcohol concentration greater than 70%, and contains less than 10% by weight of the original gland, and is effective by oral administration in relieving the symptoms of certain secondary anemias with a potency for that purpose of at least one half that of the original gland.

8. A product derived from the glands of the class which comprises the liver and the kidney of animals, which product is in solid form, is sparingly soluble in slightly acid hot water, and practicably insoluble in alcohol at an alcoholic concentration greater than 70%, and contains less than 10% by weight of the original gland, and is effective by oral administration in relieving the symptoms of certain secondary anemias with a potency for that purpose of at least one-half that of the original gland; in combination with an iron salt.

In witness whereof, I have hereunto set my hand at Indianapolis, Indiana, this 8th day of October, A. D. one thousand nine hundred and thirty.

GEORGE B. WALDEN.